(12) United States Patent
Chang

(10) Patent No.: US 7,383,622 B2
(45) Date of Patent: Jun. 10, 2008

(54) ADJUSTING DEVICE FOR ADJUSTING THE LENGTH OF A BLANK FOR A FORGING MACHINE

(75) Inventor: Yun-Te Chang, Tainan (TW)

(73) Assignee: FWU Kuang Enterprises Co., Ltd., Tainan Hsien (TW)

( * ) Notice: Subject to any disclaimer, the term of this patent is extended or adjusted under 35 U.S.C. 154(b) by 133 days.

(21) Appl. No.: 11/523,248

(22) Filed: Sep. 19, 2006

(65) Prior Publication Data

US 2008/0066516 A1    Mar. 20, 2008

(51) Int. Cl.
*B21D 53/00* (2006.01)
(52) U.S. Cl. .......................... 29/34 R; 72/352
(58) Field of Classification Search ............... 29/34 R, 29/DIG. 18, 888.071, 888.092, 888.451; 72/372, 352
See application file for complete search history.

(56) References Cited

U.S. PATENT DOCUMENTS

| | | | |
|---|---|---|---|
| 3,668,920 A * | 6/1972 | Grankowski et al. | 72/455 |
| 3,703,823 A * | 11/1972 | Wilson | 72/406 |
| 3,844,157 A * | 10/1974 | Bachmann | 72/452.9 |
| 4,000,634 A * | 1/1977 | Hixson | 72/69 |
| 4,227,394 A * | 10/1980 | Heimel | 72/356 |
| 4,317,354 A * | 3/1982 | Wisebaker | 72/339 |
| 5,195,349 A * | 3/1993 | Ishinaga et al. | 72/359 |
| 5,850,756 A * | 12/1998 | Chang | 72/344 |
| 5,893,290 A * | 4/1999 | Chang | 72/434 |
| 6,178,802 B1 * | 1/2001 | Reynolds | 72/402 |
| 7,021,111 B2 * | 4/2006 | Chang | 72/361 |
| 7,308,816 B2 * | 12/2007 | Chang | 72/421 |

\* cited by examiner

*Primary Examiner*—Dana Ross
(74) *Attorney, Agent, or Firm*—Frommer Lawrence & Haug LLP; Ronald R. Santucci

(57) ABSTRACT

An adjusting device for adjusting the length of a blank for a forging machine is provided. The device includes a cutter mounted on a support; an adjustment seat disposed movably on the support; a stop member fixed to the adjustment seat to stop and abut against an end of a rod-shaped material; a drive unit mounted on the support to move the adjustment seat so as to change the position of the stop member for adjustment of the length of the blank; and at least one fluid pressure-operated fixing unit associated with the adjustment seat. The fixing unit immobilizes the adjustment seat by abutting against the support when the fixing unit is pressurized, or permits the adjustment seat to move when the fixing unit is de-pressurized.

9 Claims, 6 Drawing Sheets

ADJUSTING DEVICE FOR ADJUSTING THE LENGTH OF A BLANK FOR A FORGING MACHINE

BACKGROUND OF THE INVENTION

1. Field of the Invention

The invention relates to a forging machine, more particularly to an adjusting device for adjusting the length of a blank to be segmented from a rod-shaped material fed to a forging machine.

2. Description of the Related Art

In common practice, the lengths of blanks cut from a rod-shaped raw material fed to a forging machine are varied according to the sizes and profiles of different products to be formed by the forging machine. Generally, the lengths of the blanks are controlled by adjusting a distance between a cutter and a stop member used to stop an end of the raw material advanced to the cutter. The smaller the distance between the stop member and the cutter, the shorter the length of a blank. However, because the stop member in the prior art is locked against movements by using a plurality of fastening screws attached to the stop member and a machine body, when it is necessary to adjust the lengths of the blanks, the fastening screws have to be loosened or detached to permit movement of the stop member relative to the machine body so as to adjust the position of the stop member. The operation to loosen and tighten the fastening screws for adjustment is inconvenient.

SUMMARY OF THE INVENTION

Therefore, an object of the present invention is to provide an adjusting device for a forging machine that can be operated easily to adjust the length of a blank to be segmented from a material fed to the forging machine.

Another object of the present invention is to provide an adjusting device that can be operated electrically to adjust the length of a blank to be segmented from a material fed to a forging machine.

Still another object of the present invention is to provide an adjusting device that can be controlled through computerized control to adjust the length of a blank segmented from a material fed to a forging machine.

According to this invention, there is provided an adjusting device for adjusting the length of a blank to be segmented from a rod-like material fed to a forging machine. The adjusting device comprises: a support; a cutter mounted on the support; an adjustment seat disposed movably on the support; a stop member fixed to the adjustment seat proximate to the cutter and adapted to stop and abut against an end of the material so that the length of the blank is limited to a distance between the stop member and the cutter; a drive unit mounted on the support to move the adjustment seat so as to change the position of the stop member relative to the cutter for adjustment of the length of the blank; and at least one fluid pressure-operated fixing unit associated with the adjustment seat. The fixing unit is capable of immobilizing the adjustment seat by abutting against the support when the fixing unit is pressurized, or permitting the adjustment seat to move relative to the support when the fixing unit is de-pressurized.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
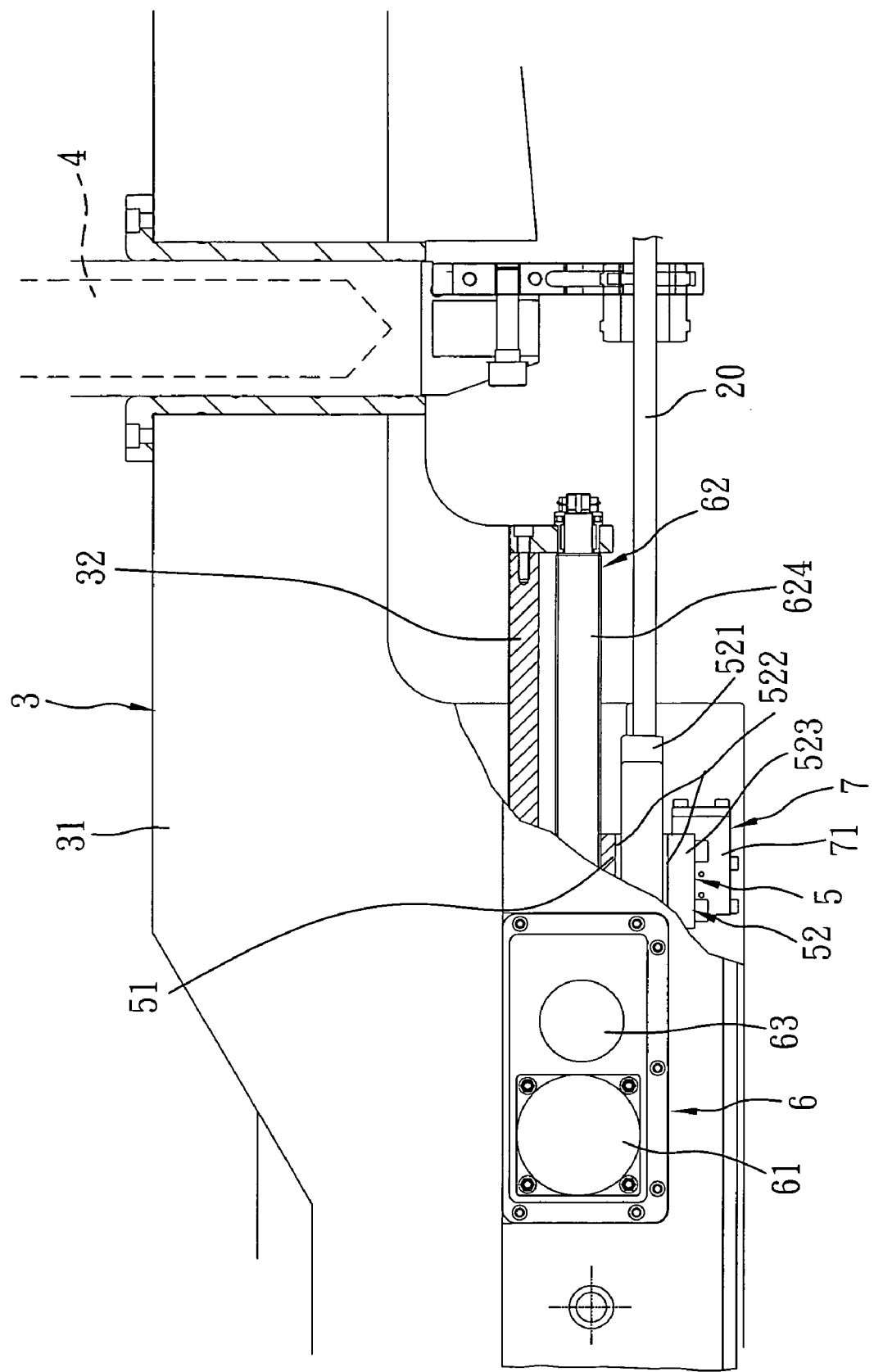
FIG. 1 is a partially sectioned top plan view showing a preferred embodiment of the adjusting device according to the present invention.
Figure 2:
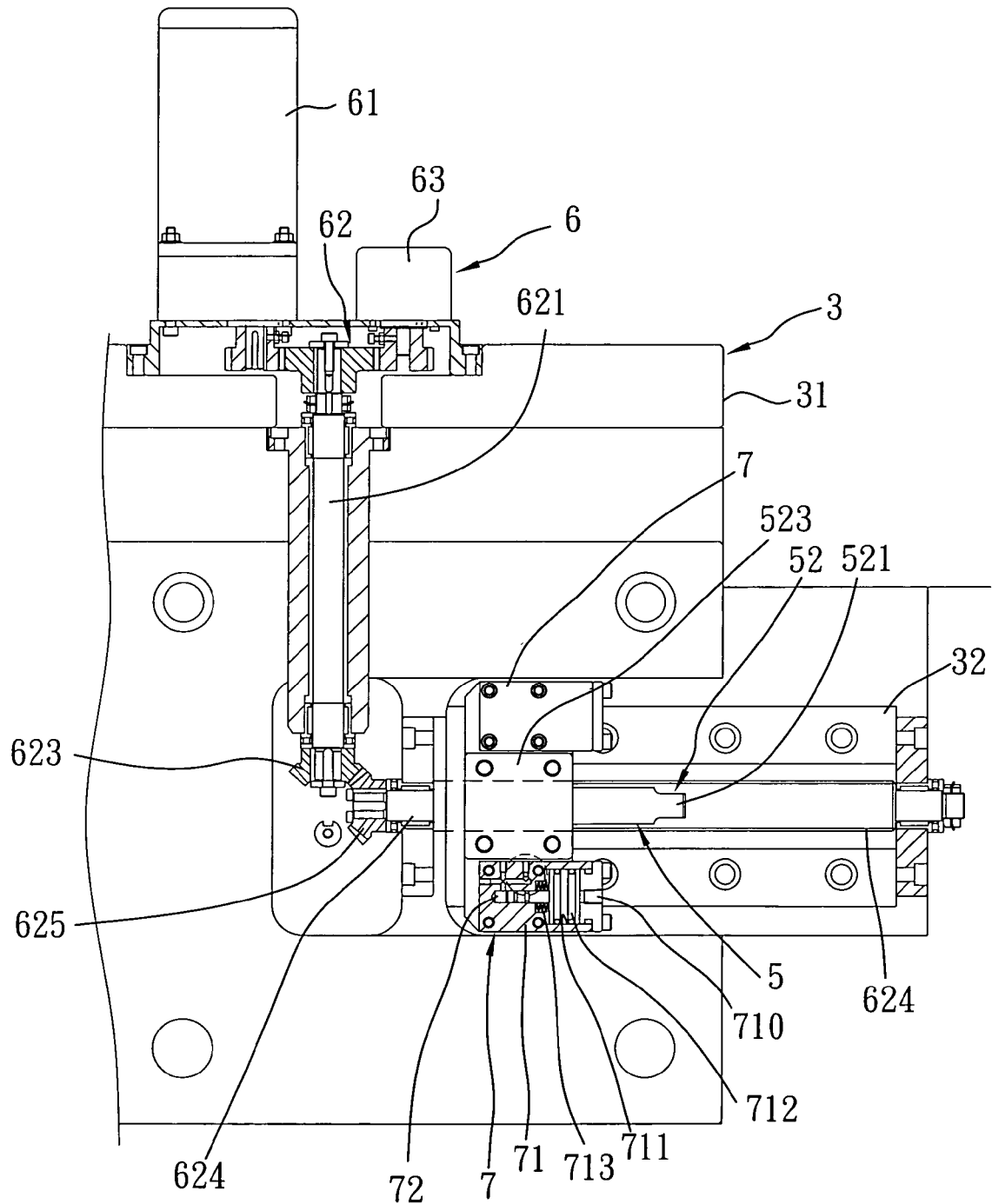
FIG. 2 is a partially sectioned front elevation view of the preferred embodiment of FIG. 1.
Figure 3:
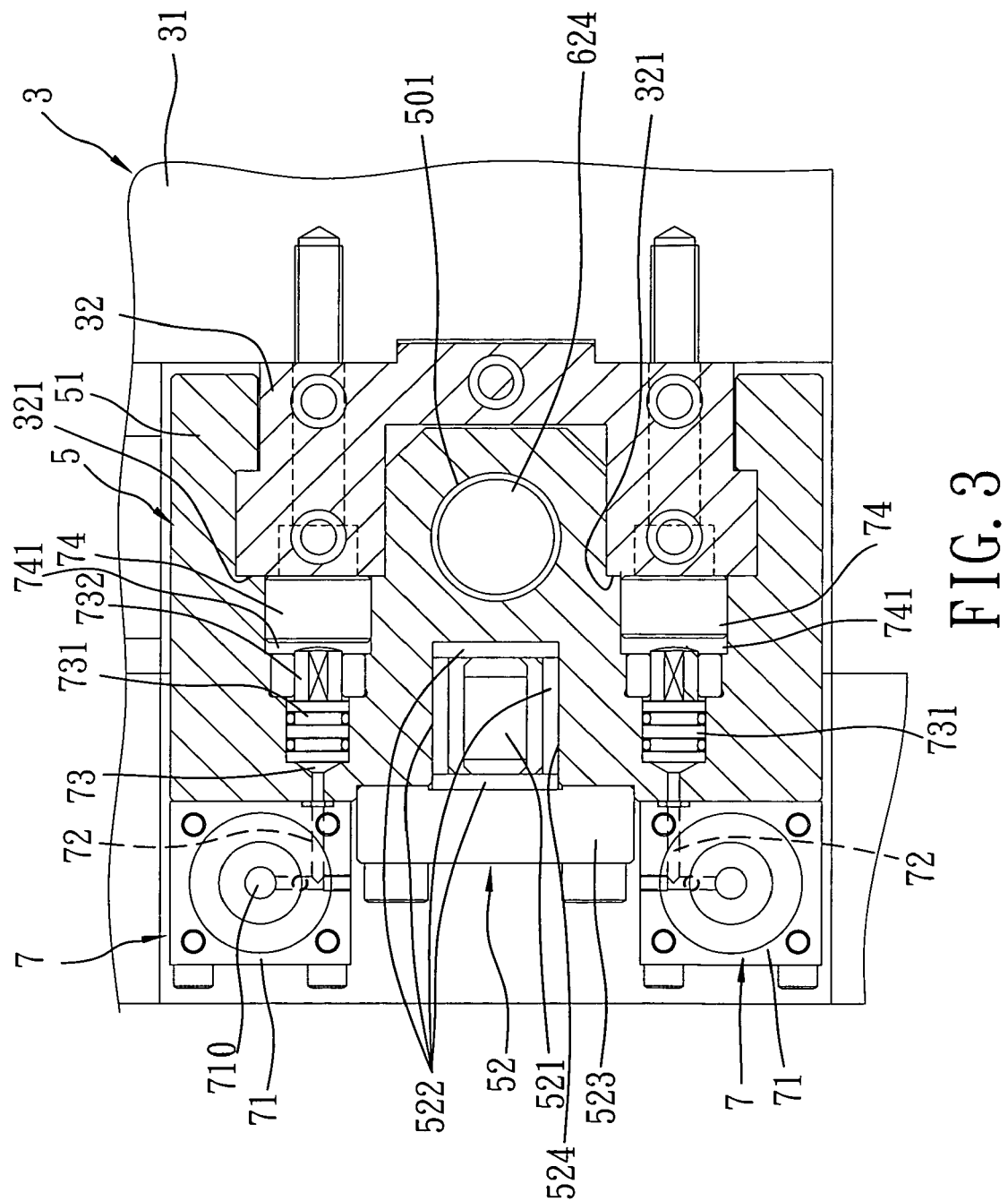
FIG. 3 is a partially sectioned right side view of the preferred embodiment of FIG. 1.

Referring to FIGS. 1, 2 and 3, according to a preferred embodiment of the present invention, there is shown an adjusting device of a forging machine for adjusting the length of a blank segmented from a rod-shaped material 20 fed continuously to the forging machine. The adjusting device includes a support 3, a cutter 4, an adjustment mechanism 5, a drive mechanism 6, and two fluid pressure-operated fixing units 7. The support 3 includes a main body 31, and a slide rail seat 32 mounted on the main body 31 and extending in a left-to-right direction, i.e. along a longitudinal direction of the rod-shaped material 20. The slide rail seat 32 has a substantially U-shaped channel opening at a rear side thereof. The cutter 4 is mounted on a right side of the main body 31 to cut a blank from a rod-shaped material 20 advanced to the main body 31. Since the construction of the cutter 4 is known, the details thereof are not provided herein for the sake of brevity.

The adjustment mechanism 5 includes an adjustment seat 51 mounted slidably on the slide rail seat 32, and a stop mechanism 52 assembled together with the adjustment seat 32 so as to move synchronously with the adjustment seat 32. The adjustment seat 51 is slidable along the longitudinal direction of the rod-shaped material 20. The slide rail seat 32 has a contact face 321 in sliding contact with the adjustment seat 51. The adjustment seat 51 has a screw hole 501 extending through left and right sides of the adjustment seat 51. The stop mechanism 52 has a stop member 521 fixed to the adjustment seat 51 proximate to the cutter 4, four non-conductive insulation plates 522 attached to four sides of the stop member 521, and a retaining member 523 disposed at one side of the stop member 521 to press the stop member 521 and the insulation plates 522 against the adjustment seat 51 and retain the same in a groove 524 of the adjustment seat 51. The length of the blank to be segmented from the rod-shaped material 20 is defined by the distance between the stop member 521 and the cutter 4 along the direction of the rod-shaped material 20.

The drive unit 6 includes a drive mechanism 61 disposed on top of the main body 31, a transmission mechanism 62 driven by the drive mechanism 61 and mounted on top of the main body 31, and a detector 63 mounted on the main body 31 and coupled to the transmission mechanism 62. In this embodiment, the drive mechanism 61 includes a motor (not shown) connected to a gear train (not shown). The transmission mechanism 62 includes a drive shaft 621 connected to the drive mechanism 61 and extending downwardly from the top of the main body 31, and a driven shaft 624 connected to the drive shaft 621 and extending horizontally and threadedly through the screw hole 501 of the adjustment seat 51. The drive shaft 621 is driven by the drive mechanism 61 and has a bottom end provided with a bevel gear 623. The transmission shaft 624 has another bevel gear 625 meshing with the bevel gear 623.

The detector 63 is connected to the drive shaft 621 and is used to detect the number of revolutions of the drive and driven shafts 621, 624 and the distance that the adjustment seat 51 is moved by the driven shaft 624.

The fixing units 7 are vertically spaced apart from each other and are disposed respectively on two opposite sides of the screw hole 501, i.e. above and below the screw hole 501. Each fixing unit 7 includes a first fluid pressure chamber 73, a first piston 731 disposed within the first fluid chamber 73, a housing 71 attached to an outer side of the adjustment seat 51 and defining a second pressure chamber 711 (see FIG. 4), a fluid channel 72 interconnecting the first and second fluid pressure chambers 73 and 711, a passage hole 710 provided at one end of the second pressure chamber 711 to permit entry or exit of a pneumatic fluid or gas, a second piston 712 disposed within the second fluid pressure chamber 711 between the fluid channel 72 and the passage hole 710, an abutment block 74, and a block-receiving hole 741 receiving the abutment block 74 and disposed between the first fluid pressure chamber 73 and the contact face 321 of the slide rail seat 32 that is in sliding contact with the adjustment seat 51. A returning spring 713 is provided in the second fluid pressure chamber 711 to urge the second piston 712 to move toward the passage hole 710. A fluid or hydraulic liquid (not shown) is provided in the first fluid pressure chamber 73 to operate within the first and second fluid pressure chambers 73, 711 and the fluid channel 72. The abutment block 74 is movable within the block-receiving hole 741. When the first fluid pressure chamber 73 is pressurized, the abutment block 74 can be in tight abutment with the contact face 321 of the slide rail seat 32. Preferably, a pusher 732 is attached to the first piston 731 and extends slidably through a sleeve 733 to the block-receiving hole 741.

Figure 4:
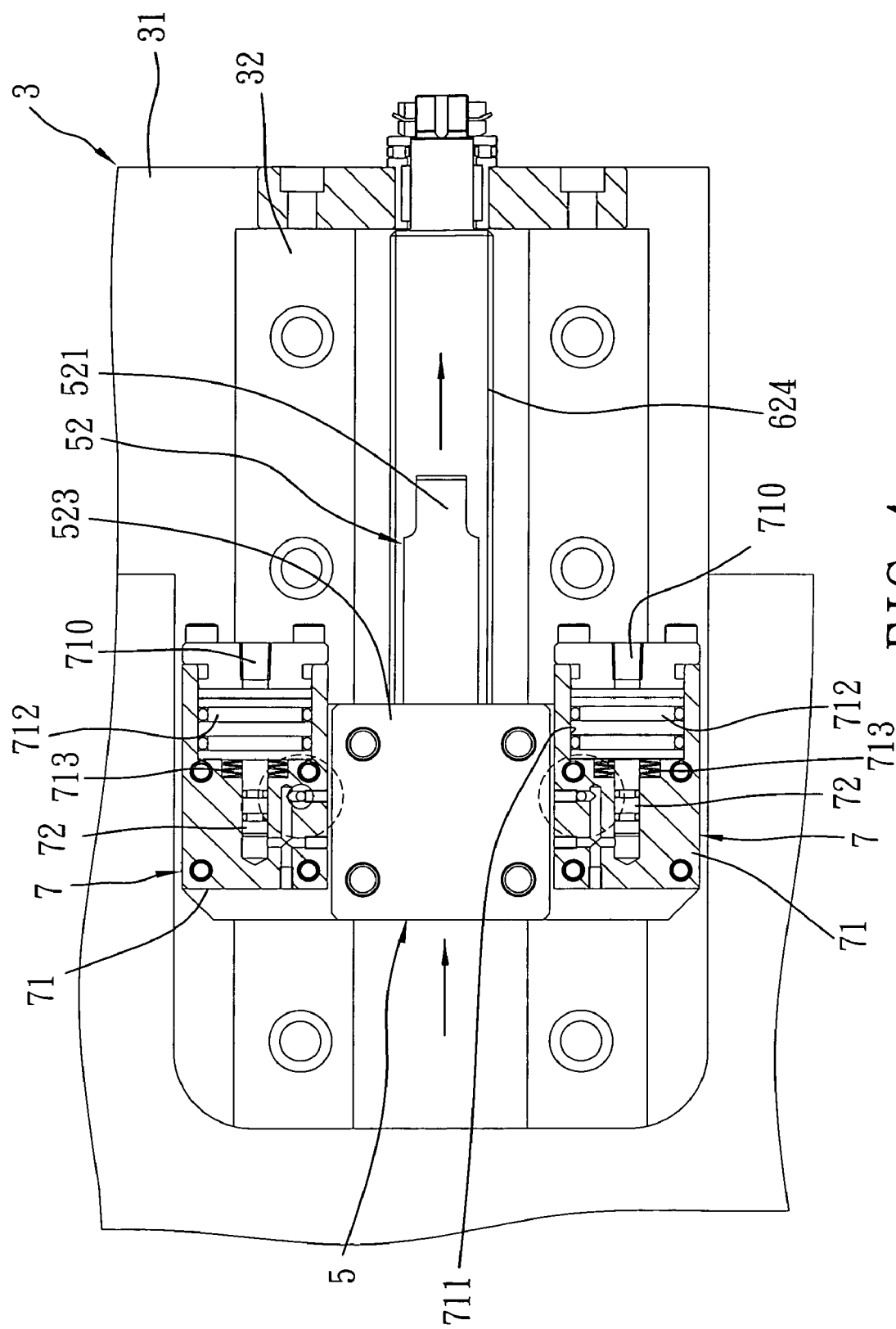
FIG. 4 is a partially sectioned enlarged view of a portion of the preferred embodiment shown in FIG. 2.
Figure 6:
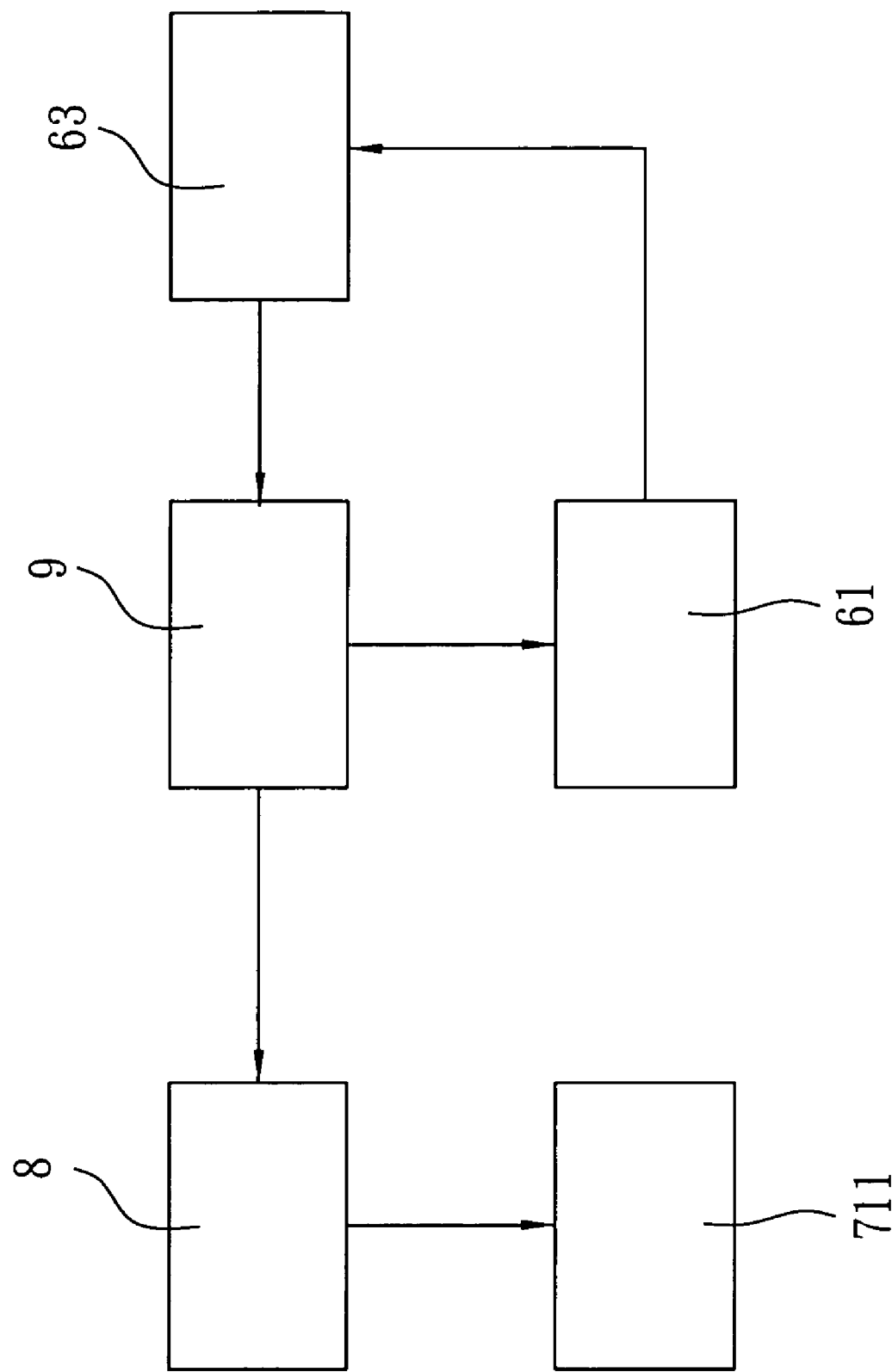
FIG. 6 is a block diagram showing the relationships among a control unit, a detector, a drive mechanism, an air compressor and a second fluid pressure chamber.

Referring to FIG. 6 in combination with FIG. 4, in this preferred embodiment, an air compressor 8 is provided to connect with the second fluid pressure chambers 711 through the respective passage holes 710 to introduce a high-pressure gas into the second fluid pressure chambers 711. In addition, a control unit 9 is provided to connect with the air compressor 8, the drive mechanism 61 and the detector 63 in order to control the operations of the air compressor 8 and the drive mechanism 61. The controlling of the air compressor 8 and the drive mechanism 61, and the adjusting and cutting operations of the adjustment mechanism 5 and the cutter 4 in the present invention are described hereinafter.

When it is desired to adjust the length of the blank to be segmented from the rod-shaped material 20, a high pressure gas introduced previously into the second fluid pressure chambers 711 from the air compressor 8 is first expelled from the second fluid pressure chambers 711 to de-pressurize the first fluid pressure chambers 73. As a result, the pressure on the abutment blocks 74 are released, and the abutment blocks 74 do not abut against the contact face 321 of the slide rail seat 32 so that the adjustment seat 51 is permitted to move relative to the slide rail seat 32. Subsequently, the control unit 9 sends a signal to the drive mechanism 61 to drive the drive shaft 621 and the transmission shaft 624 so that the adjustment seat 51 is moved, thereby changing the position of the stop member 521. The distance that the stop member 521 is moved is detected by the detector 63. In response to the signals from the detector 63, the control unit 9 controls the drive mechanism 61 to stop its operation when the stop member 521 reaches a predetermined distance. The length of the blank corresponding to the distance between the stop member 521 and the cutter 4 along the longitudinal direction of the rod-shaped material 20 is therefore adjusted.

Figure 5:
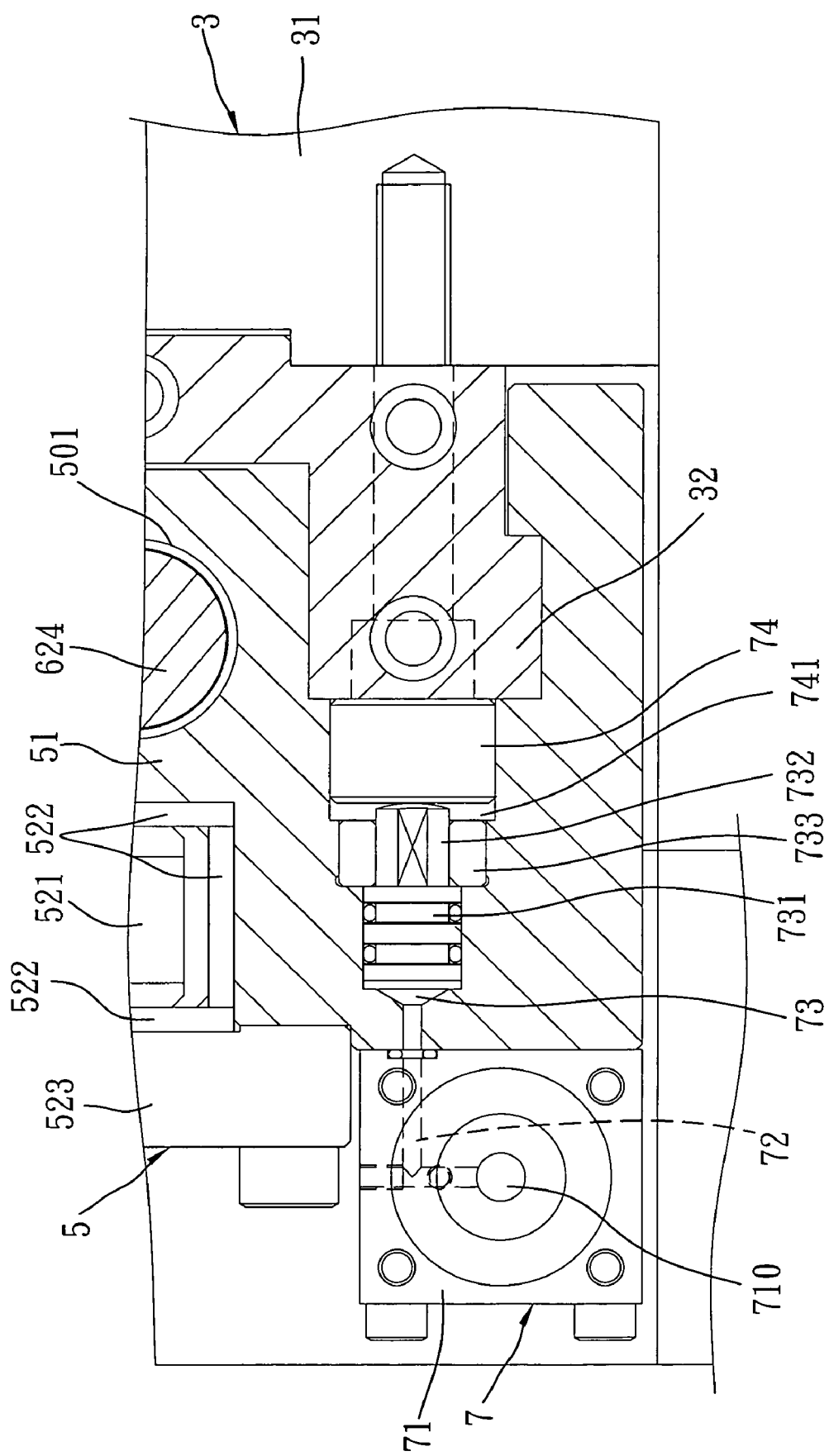
FIG. 5 is a partially sectioned enlarged view of a portion of the preferred embodiment shown in FIG. 3.

Referring to FIGS. 4 and 5, when the drive mechanism 61 stops, the air compressor 8 is activated by the control unit 9 to introduce the high pressure gas into the second fluid pressure chambers 711 through the respective passage holes 710. The second pistons 712 thus push the hydraulic liquid in the second fluid pressure chambers 711 to the respective first fluid pressure chambers 73 through the fluid channels 72, thereby pressurizing the first fluid pressure chambers 73 and compressing the returning springs 713. As the first fluid pressure chambers 73 are pressurized, the first pistons 731 move the respective pushers 732, which in turn press the abutment blocks 74 against the contact face 321 of the slide rail seat 32 so that the abutment blocks 74 are in tight abutment with the contact face 321. As a result, the adjustment seat 51 is immobilized together with the stop member 521.

In case further adjustment of the length of the blank is necessary, the high-pressure gas must be discharged from the second fluid pressure chambers 711 to de-pressurize the first fluid pressure chambers 73. Under this circumstance, the returning springs 713 expand, and the second pistons 712 are urged by the respective returning springs 713 to move toward the passage holes 710, thereby de-pressurizing the first fluid pressure chambers 73 and permitting the adjustment seat 51 to move relative to the slide rail seat 32.

While the abutment blocks 74 are used in this preferred embodiment to abut against the contact face 321 of the slide rail seat 32 and to immobilize the adjustment seat 51, the abutment blocks 74 may be dispensed with according to the present invention. In this case, the first pistons 731 may be designed such that they directly abut against the contact face 321 of the slide rail seat 32 in place of the abutment blocks 74. In addition, the number of the fixing units 7 should not be limited to two, and may be decreased or increased.

Moreover, it is contemplated that a switch could be provided to activate and de-activate the operation of the drive mechanism 61 so that the use of the control unit 9 and the detector 63 can be dispensed with. Furthermore, the drive shaft 621 may be designed such that it can be operated manually so that the drive mechanism 61 is not needed. Besides, the use of the drive shaft 621 may be eliminated by connecting the dive mechanism 61 and the detector 63 directly to the driven shaft 624.

Since the fluid pressure-operated fixing units 7 are used to immobilize the adjustment seat 51, it is easy to loosen or tighten the adjustment seat 51 relative to the slide rail seat 32. In addition, the length of the blank may be adjusted through computerized control due to the provision of the detector 63 and the drive mechanism 61.

While the present invention has been described in connection with what is considered the most practical and preferred embodiment, it is understood that this invention is not limited to the disclosed embodiments but is intended to cover various arrangements included within the spirit and scope of the broadest interpretation so as to encompass all such modifications and equivalent arrangements.

I claim:

1. An adjusting device for adjusting the length of a blank segmented from a rod-like material fed to a forging machine, comprising:
   a support (3);
   a cutter (4) mounted on said support (3);
   an adjustment seat (51) disposed movably on said support (3);
   a stop member (521) fixed to said adjustment seat proximate to said cutter and adapted to stop and abut against an end of the material so that the length of the blank is limited to a distance between said stop member and said cutter;
   a drive unit mounted on said support to move said adjustment seat so as to change the position of said stop member relative to the cutter for adjustment of the length of the blank; and
   at least one fluid pressure-operated fixing unit associated with said adjustment seat, said fixing unit being capable of immobilizing said adjustment seat by abutting against said support when said fixing unit is pressurized, or permitting said adjustment seat to move relative to said support when said fixing unit is de-pressurized.

2. The adjusting device of claim 1, wherein said adjustment seat includes a screw hole, and said drive unit includes a driven shaft extending rotatably and threadedly through said screw hole to move axially said adjustment seat.

3. The adjusting device of claim 2, wherein said drive unit further includes a drive shaft connected to said driven shaft, and a detector to detect the number of revolutions of said drive shaft and to determine a distance that said adjustment seat is moved by said driven shaft.

4. The adjusting device of claim 1, wherein said support has a slide rail seat extending along a longitudinal direction of the rod-shaped material, said adjustment seat being mounted slidably on said slide rail seat, said slide rail seat having a contact face in sliding contact with said adjustment seat.

5. The adjusting device of claim 4, wherein said fixing unit includes a first fluid pressure chamber formed within said adjustment seat, said fixing unit abutting against said contact face of said slide rail seat when said first fluid pressure chamber is pressurized.

6. The adjusting device of claim 5, wherein said fixing unit further includes a first piston disposed within said first fluid pressure chamber and movable toward said contact face when said first fluid pressure chamber is pressurized.

7. The adjusting device of claim 6, wherein said fixing unit further includes a block-receiving hole formed in said adjustment seat between said contact face and said first fluid pressure chamber, and an abutment block disposed movably within said block-receiving hole to be pressed by said first piston so that said abutment block is in tight abutment with said contact face when said first fluid pressure chamber is pressurized.

8. The adjusting device of claim 7, wherein said fixing unit further includes a second fluid pressure chamber, a fluid channel intercommunicating said first and second fluid pressure chambers, a fluid operating within said first and second fluid pressure chambers and said fluid channel, a passage hole communicated with said second fluid pressure chamber and opposite to said fluid channel, a second piston disposed in said second fluid pressure chamber between said fluid channel and said passage hole, and a fluid operable in said second fluid pressure chamber by passing through said passage hole to push said second piston toward said fluid channel so as to pressurize said first fluid pressure chamber.

9. The adjusting device of claim 8, wherein said fixing unit further includes a returning spring disposed in said second fluid pressure chamber to urge said second piston to move toward said passage hole.

* * * * *